(12) United States Patent
Kubota

(10) Patent No.: US 8,359,633 B2
(45) Date of Patent: Jan. 22, 2013

(54) ACCESS CONTROL SYSTEM AND ACCESS CONTROL METHOD

(75) Inventor: Makoto Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 235 days.

(21) Appl. No.: 13/013,059

(22) Filed: Jan. 25, 2011

(65) Prior Publication Data

US 2011/0185398 A1 Jul. 28, 2011

(30) Foreign Application Priority Data

Jan. 28, 2010 (JP) .................................. 2010-16813

(51) Int. Cl.
H04L 29/06 (2006.01)

(52) U.S. Cl. ............................. 726/3; 709/203; 709/223

(58) Field of Classification Search ...... 726/3; 709/203, 709/223

See application file for complete search history.

(56) References Cited

U.S. PATENT DOCUMENTS

| | | | | |
|---|---|---|---|---|
| 7,937,438 B1 * | 5/2011 | Miller et al. | ................... | 709/203 |
| 2004/0015725 A1 * | 1/2004 | Boneh et al. | ................... | 713/201 |
| 2008/0168163 A1 * | 7/2008 | Kurokawa | ..................... | 709/223 |
| 2010/0088397 A1 * | 4/2010 | Jaudon et al. | ................. | 709/220 |

FOREIGN PATENT DOCUMENTS

JP 2009-259046 11/2009

* cited by examiner

*Primary Examiner* — Jason Gee

(74) *Attorney, Agent, or Firm* — Fujitsu Patent Center

(57) ABSTRACT

A system including a providing unit that provides a virtual-desktop-service selected on the basis of an identification information acquired from the terminal apparatus, and sends a message that includes an address of the providing unit and an address of an application program booted by a process of the virtual-desktop-service, a storage unit that stores the identification information associated with the address of the providing unit and an access control information associated with a set of a identification information and an address of an application program, and a relay unit that receives a message sent by the providing unit, acquires an identification information associated with a source address included in the received message, acquires an access control information associated with a set of the acquired identification information and a destination address included in the received message, and controls relaying the message depending on the acquired access control information.

6 Claims, 23 Drawing Sheets

FIG. 12

| USER ID | PASSWORD | COMPANY NAME | VLAN-ID | VM_ID |
|---|---|---|---|---|
| user001 | xx | COMPANY A | VLAN#A | ID#a1 |
|  |  |  |  |  |

FIG. 13

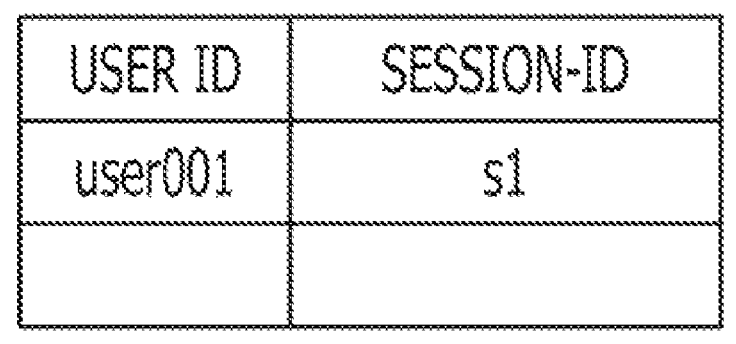

| USER ID | SESSION-ID |
|---|---|
| user001 | s1 |
|  |  |

FIG. 14

| ACCESS-SOURCE TERMINAL-APPARATUS INFORMATION || ACCESS-SOURCE USER INFORMATION | TENANT IDENTIFIER | VD_IP |
|---|---|---|---|---|
| LINE | TERMINAL-APPARATUS TYPE | USER ID | | |
| MOBILE | I-PHONE | USER001 | VLAN#A | vd#a1 |

FIG. 16

| TRANSMISSION-SOURCE IP | DESTINATION IP | AMOUNT OF FLOW |
|---|---|---|
| TERMINAL IPxx | vd#a1 | 0 |
| | | |

FIG. 17

| DESTINATION | ACCESS-SOURCE USER | ACCESS-SOURCE TERMINAL | AVAILABILITY |
|---|---|---|---|
| URL-A1 | USER001 | OFFICE | YES |
| | | MOBILE | NO |
| | | INTERNET | NO |

FIG. 18

| VLAN | TRANSMISSION-SOURCE IP |
|---|---|
| VLAN#A | vd#a1~an |

FIG. 19

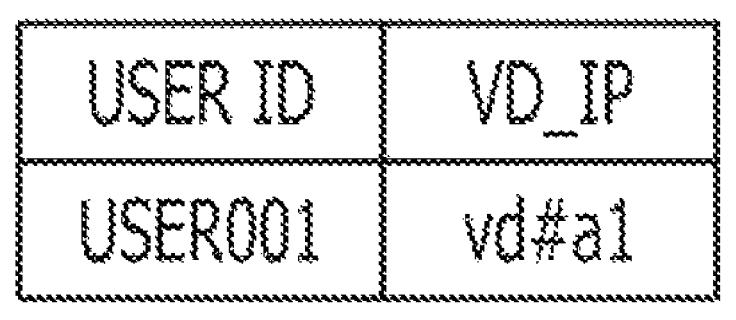

| USER ID | VD_IP |
|---------|-------|
| USER001 | vd#a1 |

ACCESS CONTROL SYSTEM AND ACCESS CONTROL METHOD

CROSS-REFERENCE TO RELATED APPLICATIONS

This application is based upon and claims the benefit of priority of the prior Japanese Patent Application No. 2010-16813, filed on Jan. 28, 2010, the entire contents of which are incorporated herein by reference.

FIELD

The embodiments disclosed herein are related to an access control technology.

BACKGROUND

Today, many employees of companies work at various locations, such as offices, destinations for business trips, and homes. Under such situations, preparing computers usable by the employees at the individual places involves a great deal of time and effort for the companies and the employees. Since the desktop processing units change each time the employees move, there is also a problem in that the continuity of their work is interrupted. To overcome such a problem, a service called DaaS (Desktop as a Service) is drawing attention in recent years.

The DaaS is a service in which user's desktop environments are constructed at a center and screen information to be displayed on the desktops of terminal apparatuses is supplied from the center over a network. FIG. 1 schematically illustrates a DaaS. The provider of a DaaS service is a DaaS service provider (hereinafter simply referred to as a "provider") and a user of the DaaS service is, for example, a company or an employee in a company. FIG. 2 illustrates a schematic configuration of a system that provides a DaaS service. The provider prepares, in its center (hereinafter referred to as a DaaS center), a virtual desktop environment (hereinafter referred to as a VD (virtual desktop) processing unit) and network environments (hereinafter, "in-DaaS-center company networks") that are physically separated for individual companies using the services. The entity of the VD processing unit includes an OS (operating system), such as Windows® OS, and a virtual machine (VM) having the OS. Upon receiving a VD-processing-unit use request from a user, the VD processing unit is started on a physical server apparatus (hereinafter referred to as a "server apparatus").

Employees (hereinafter referred to as "users") of a company having a subscription contract with the provider can use the DaaS service in the following manner. (1) Using the user's terminal, he or she connects to the in-DaaS-center company network. The user issues a connection request to the VPN (virtual private network) gateway apparatus located at the entrance of the DaaS center, constructs a VPN tunnel between the terminal apparatus and the VPN gateway apparatus after authentication, and logs into the in-DaaS-center company network of the company he or she belongs. Subsequently, access to the in-DaaS-center company network is made through the VPN tunnel. (2) The user accesses a server apparatus (hereinafter referred to as a "portal server apparatus") that provides an authentication screen for use of the DaaS. The portal server apparatus then authenticates the user, starts the VD processing unit (the VM and the OS) for the user, and then reports the IP address of the VD processing unit to the terminal apparatus. (3) The terminal apparatus connects to the VD processing unit indicated by the reported IP address, in accordance with an RDP (remote desktop protocol). The RDP is a protocol that allows operation information of a keyboard, mouse, and so on of his/her terminal apparatus to be reported to the VD processing unit and also allows a screen on the VD processing unit to be supplied to his/her terminal apparatus. (4) When the terminal apparatus connects to the VD processing unit through procedures (1) to (3) described above, the user can perform work using the same desktop environment, even though he or she works using, physically, various different terminals inside and outside the company. During the work, since each VD processing unit is connected to the in-DaaS-center company network, the user who accesses the VD processing unit can use an application processing unit on the VD processing unit and thus can use an in-house application server apparatus (hereinafter simply referred to as an "application server apparatus") without using an external network.

From the viewpoint of prevention of secret-information leakage, the company wishes to be able to realize accessibility control (hereinafter referred to as "access control") according to the application server apparatus of a VD-processing-unit access source and an access destination, while achieving a system that enables access from the VD processing unit to the application server apparatus. For example, highly confidential applications, such as accounting applications, require access control, such as permitting access from an in-house PC (personal computer) but prohibiting access from an external terminal apparatus. The term "access source" as used herein refers to the location of the terminal apparatus accessing the VD processing unit, a terminal-apparatus type, or the user who is using the terminal apparatus.

The access source appears like a VD processing unit to the application server apparatus in each company that receives an access request from the Web on the VD processing unit, thus making the VD-processing-unit access source unknown.

Performing access control at a VPN gateway apparatus of related art will now be described. The VPN gateway apparatus can recognize access-source information during reception of a VPN connection request from a terminal apparatus. Thus, when the terminal apparatus accesses the application server apparatus without using the VD processing unit, the VPN gateway apparatus can perform access control corresponding to the access source and an URL. The information that passes through the VPN gateway apparatus during use of the DaaS service is an RDP message between the terminal apparatus and the VD processing unit, and the RDP is encrypted. Thus, as illustrated in FIG. 3, even though the known VPN gateway apparatus can obtain a message, it cannot read a destination URL and thus cannot perform access control for each destination application server apparatus.

An example in which a relay apparatus between the VD processing unit and the application server apparatus performs access control will further be described as another example of the related art. Information that passes through the relay apparatus during use of the DaaS is a message transmitted from the VD processing unit to the application server apparatus, so that the application server apparatus at the access destination can be read from the destination URL. However, since the transmission source of the message is an IP address or a port of the VD processing unit, as illustrated in FIG. 3, the relay apparatus of the related art cannot know the VD-processing-unit access source on the basis of the message and thus cannot perform access control corresponding to the access source.

As described above, typically, there is a problem in that access control corresponding to VD-processing-unit access-source information and the destination application server apparatus cannot be performed when access is made from the VD processing unit to the application server apparatus.

SUMMARY

According to an aspect of the invention, a system includes a providing unit that provides a virtual-desktop-service, which was selected on the basis of an identification information acquired from a terminal apparatus, to the terminal apparatus, and sends a message that includes an address of the providing unit as a source address and an address of an application program booted by a process of the virtual-desktop-service as a destination address; a first storage unit that stores the identification information associated with the address of the providing unit; a second storage unit that stores an access control information associated with a set of a identification information and an address of an application program; and a relay unit that receives a message sent by the providing unit, acquires an identification information, which was associated with an address corresponding to a source address included in the received message, from the first storage unit, acquires an access control information, which was associated with a set of the acquired identification information and an address corresponding to a destination address included in the received message, from the second storage unit, and controls relaying the message depending on the acquired access control information.

The object and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 illustrates one example of an authentication data storage unit in the first embodiment;
FIG. 13 illustrates one example of a user-session table in the first embodiment;
FIG. 14 illustrates one example of a management table storage unit in the first embodiment;
FIG. 16 illustrates one example of a connection table in the first embodiment;
FIG. 17 illustrates one example of a policy table storage unit in the first embodiment;
FIG. 18 illustrates one example of a condition table storage unit in the first embodiment;
FIG. 19 illustrates one example of a user-VD table.

DESCRIPTION OF EMBODIMENTS

Embodiments for carrying out the present invention will be described below with reference to the accompanying drawings.

(Operation Principle of Access Control System According to Embodiment)

Figure 1:
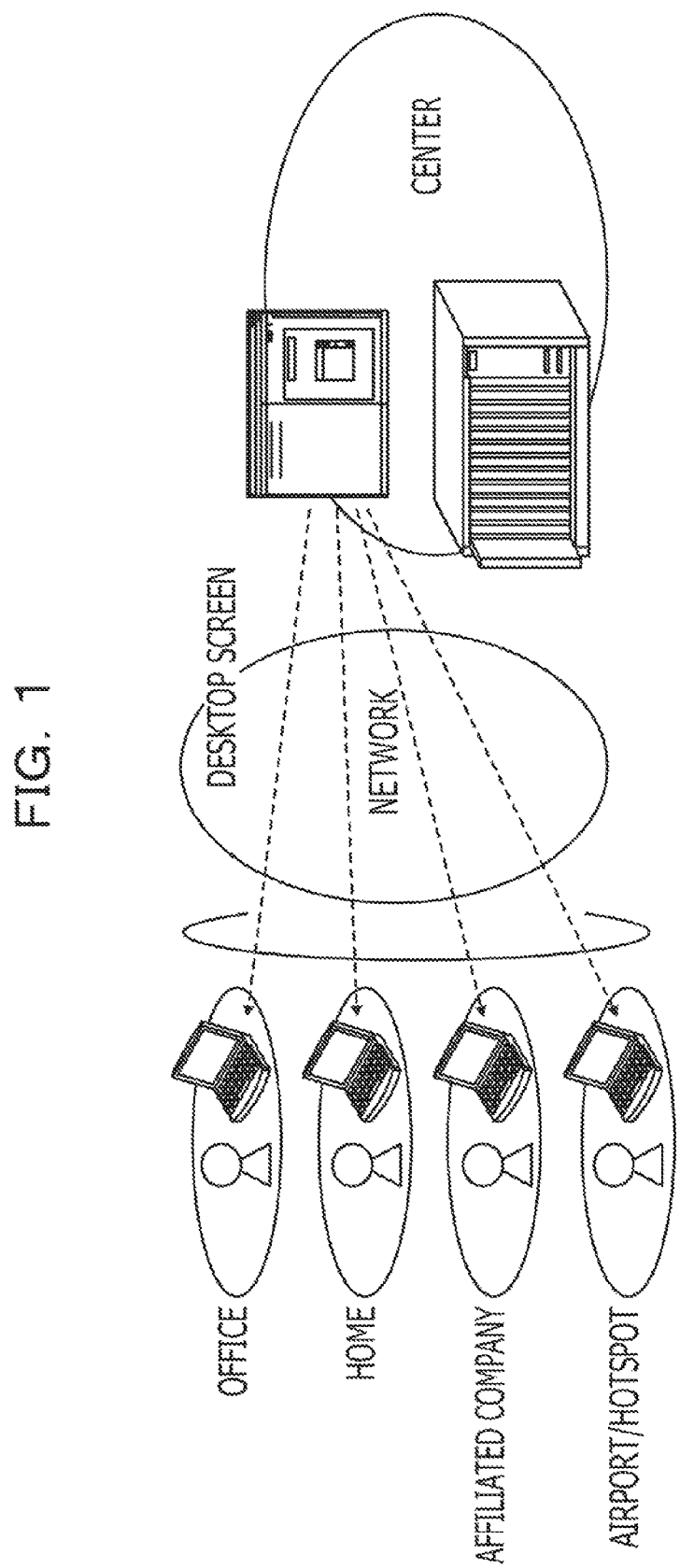
FIG. 1 illustrates a DaaS service.
Figure 2:
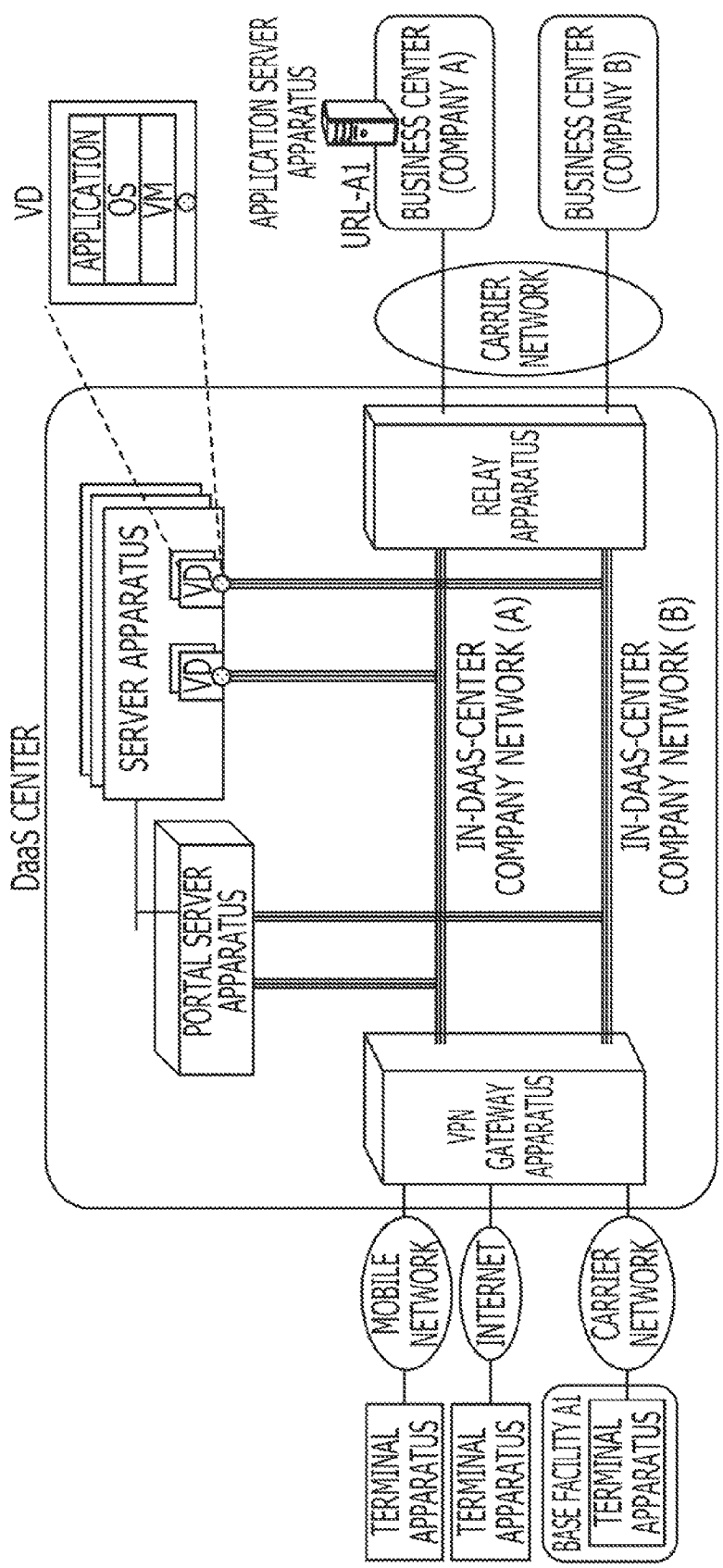
FIG. 2 illustrates a DaaS service of related art.
Figure 3:
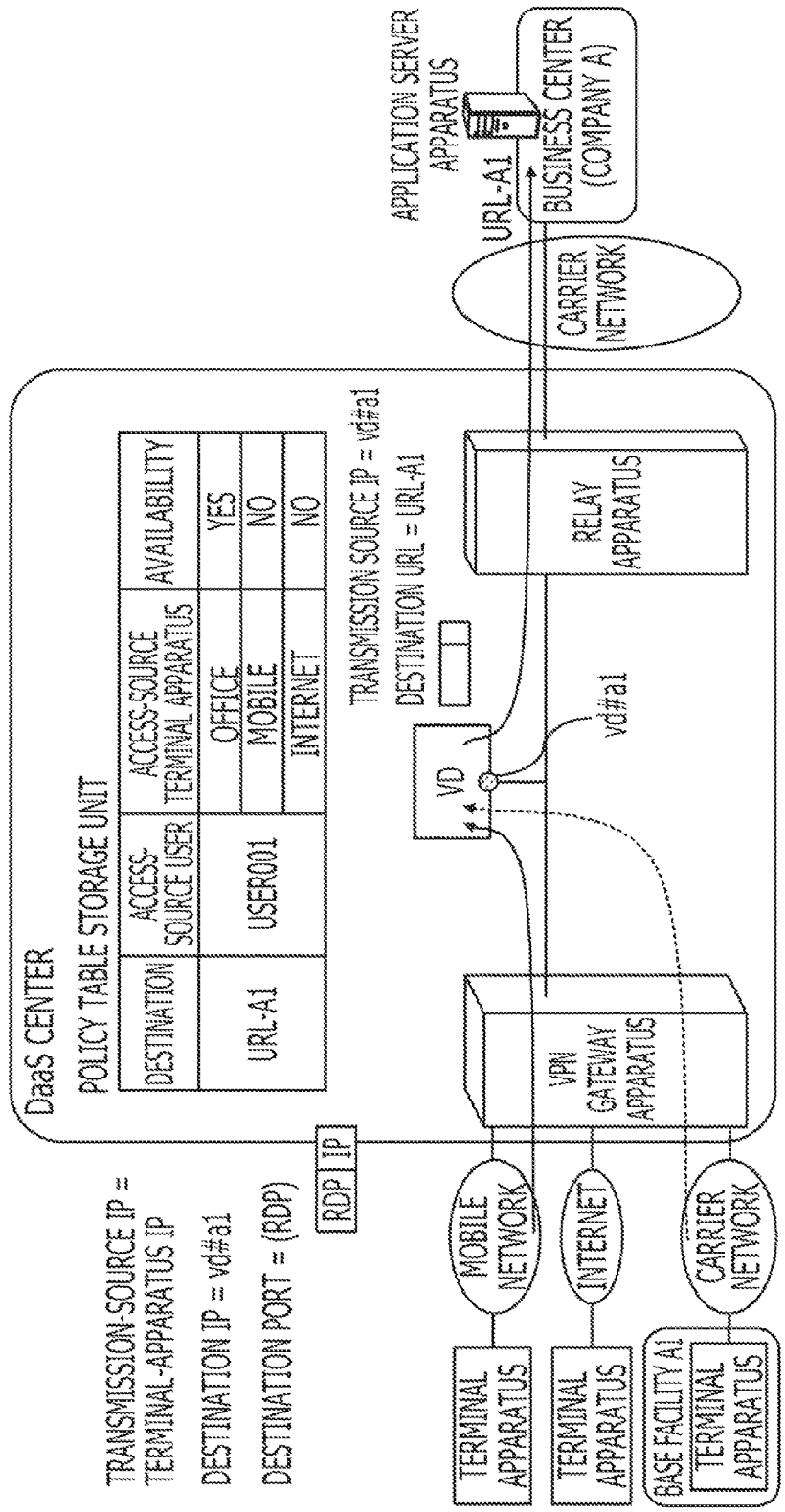
FIG. 3 illustrates a problem of the related art.
Figure 4:
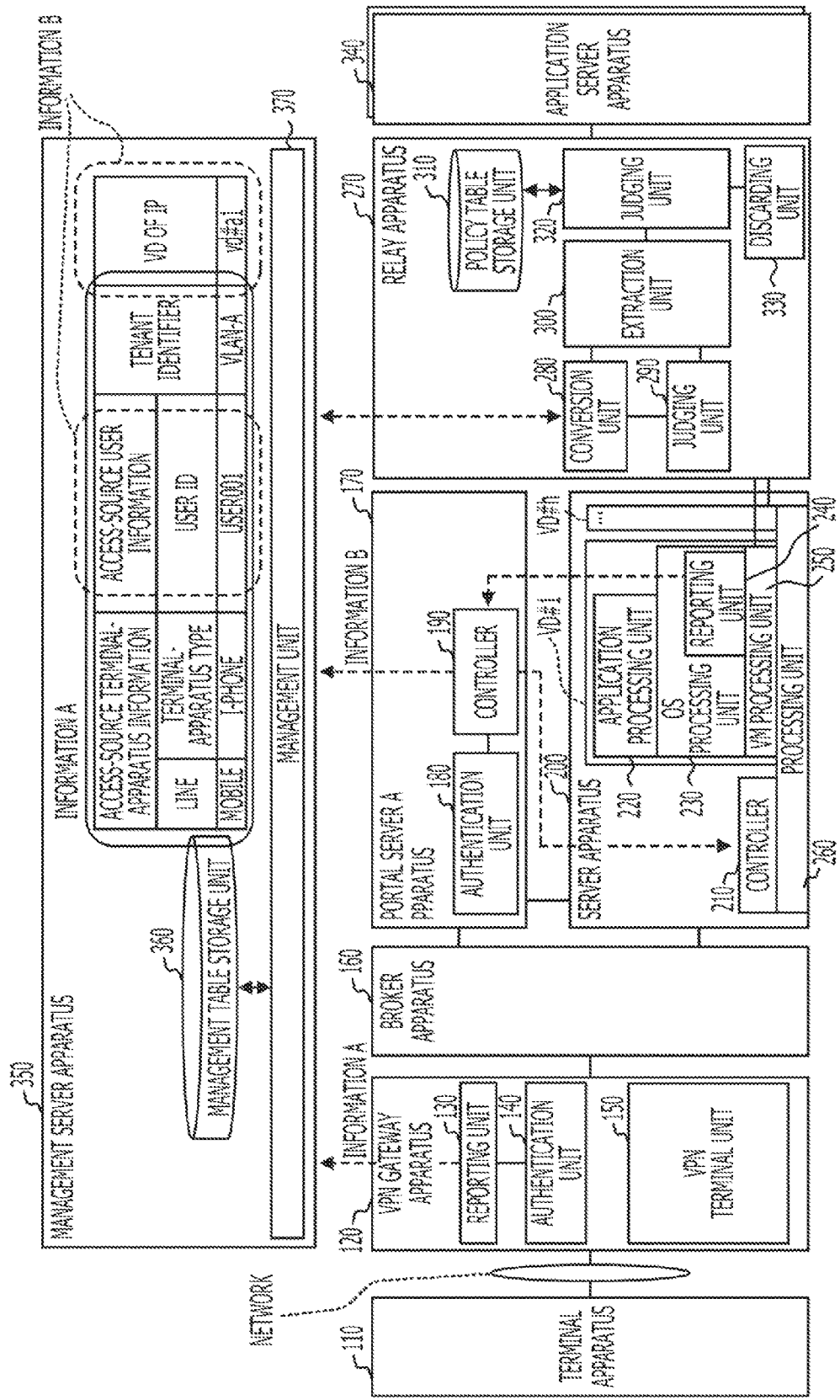
FIG. 4 illustrates an operation principle of an access control system according to an embodiment.

An operation principle of an access control system 100 according to an embodiment will be described with reference to FIG. 4.

A VPN gateway apparatus 120 has a reporting unit 130, an authentication unit 140, and a VPN terminal unit 150. Upon receiving a VPN connection request from a terminal apparatus 110, the authentication unit 140 authenticates a user on the basis of a user ID (hereinafter referred to as a "uID") and a password. When the authentication succeeds, the VPN terminal unit 150 constructs or terminates a VPN with the terminal apparatus 110. The reporting unit 130 refers to an authentication data storage unit to specify a network identifier (hereinafter referred to as a "tenant identifier") of an in-DaaS-center company network for a company to which the user belongs. Thereafter, the reporting unit 130 reports, to a management server apparatus 350 (described below), a set of information regarding the uID of the user to be authenticated, information regarding the access-source terminal apparatus, and the tenant identifier.

A portal server apparatus 170 has an authentication unit 180 and a controller 190. Upon receiving a VD-processing-unit use request from the terminal apparatus 110, the authentication unit 180 authenticates the user on the basis of the uID and a password. When the authentication succeeds, the authentication unit 180 includes VD-processing-unit IP information in a response to the terminal apparatus 110. When the authentication performed by the authentication unit 180 succeeds, the controller 190 refers to an authentication data storage unit 390 to specify an instance ID (hereinafter referred to as "VM_ID") of a VM for the uID. Thereafter, the controller 190 instructs a server apparatus 200 (described below) to start a VM processing unit 250 identified with the VM_ID and a VD processing unit 215 corresponding to an OS processing unit 230 on the VM processing unit 250.

In addition, upon receiving the IP information and the VM_ID from the started VD processing unit 215, the controller 190 refers to the authentication data storage unit 390 to specify a uID corresponding to the VM_ID, caches a set of the received VD-processing-unit IP information and the uID into a user-VD table, and reports the set to the management server apparatus 350. Thereafter, upon user authentication, the controller 190 reports the IP information of the VD processing unit 215.

When the controller 190 receives, from a broker apparatus 160, a request for stopping the VD processing unit 215 having the specific IP, the controller 190 obtains a uID corresponding to the IP from the cache and further refers to the authentication data storage unit 390 to specify a VM_ID for the uID. Thereafter, the controller 190 instructs the server apparatus 200 (described below) to stop the VM processing unit 250 identified with the VM_ID. In addition, the controller 190 requests the management server apparatus 350 to release the IP information of the VD processing unit 215 associated with the uID.

The server apparatus 200 has a controller 210, the VD processing unit 215, a reporting unit 240, and a processing unit 260. The processing unit 260 is a physical server unit on which the VM runs. The controller 210 controls start and stop of the VM on the processing unit 260. The VD processing unit 215 includes the VM processing unit 250, the OS processing unit 230, and an application processing unit 220 for a browser or the like. The reporting unit 240 reports a pair of the IP address of the VD processing unit 215 and the VM_ID to the portal server apparatus 170.

In the present embodiment, a portion including the portal server apparatus 170 and the server apparatus 200 is one example of a providing unit.

The broker apparatus 160 is an existing apparatus and means for monitoring a connection between the terminal apparatus and the VD processing unit. By referring to the contents of a message transmitted from the portal server apparatus 170, the broker apparatus 160 obtains destination IP information of an RDP connection established between the terminal apparatus and the VD processing unit and then monitors the connection. When there is no flow for a certain period of time, the broker apparatus 160 recognizes that the connection is broken and requests the portal server apparatus 170 to stop the VD processing unit 215 identified with the destination IP.

The management server apparatus 350 has a management unit 370. On the basis of a report from the VPN gateway apparatus 120 and the portal server apparatus 170, the management unit 370 records the uID of the user using the VD processing unit 215, access-source terminal-apparatus information, a tenant identifier, and the IP information of the VD processing unit 215 used by the user to the management table storage unit 360 and deletes records therefrom.

In the present embodiment, the management server apparatus 350 is one example of a managing unit.

A relay apparatus 270 has a conversion unit 280, a judging unit 290, an extraction unit 300, and a judging unit 320. On the basis of the tenant identifier and the transmission-source IP of a received message, the judging unit 290 judges whether or not the received message is one transmitted from the VD processing unit 215. When the received message is one transmitted from the VD processing unit 215, the conversion unit 280 queries the management server apparatus 350 to obtain access-source information corresponding to the tenant identifier and the transmission-source IP. The extraction unit 300 extracts a destination URL in the message. The judging unit 320 judges whether or not the message can be transferred using the access-source information, the destination URL, and so on.

A flow of the processing of the access control system 100 will be described below. A user who wishes to use the VD processing unit 215 first issues a VPN connection request to the VPN gateway apparatus 120 by using his/her terminal apparatus 110. When the authentication performed by the authentication unit 140 succeeds, the VPN gateway apparatus 120 uses the reporting unit 130 to report the access-source information to the management server apparatus 350. The management server apparatus 350 records the reported uID, the access-source terminal-apparatus information, and the tenant identifier to the management table storage unit 360. Thereafter, the VPN gateway apparatus 120 transmits an authentication completion response to the terminal apparatus 110. The terminal apparatus 110 constructs a tunnel between the terminal apparatus 110 and the VPN terminal unit 150 in the VPN gateway apparatus 120 and transmits/receives a message through the tunnel.

Thereafter, when the authentication performed by the authentication unit 180 succeeds, the portal server apparatus 170 that has received a VD-processing-unit use request from the terminal apparatus 110 starts the VD processing unit 215 for the user by using the controller 190. The reporting unit 240 incorporated into the OS processing unit 230 in the started VD processing unit 215 reports a pair of the VD-processing-unit IP information and the VM_ID to the portal server apparatus 170. The controller 190 in the portal server apparatus 170 changes the reported VM_ID to the uID and then reports the reported pair of the IP information and the uID to the management server apparatus 350. The management server apparatus 350 records the reported IP information to an entry for the reported uID in the management table storage unit 360.

The authentication unit 180 in the portal server apparatus 170 reports the IP information of the VD processing unit 215 to the terminal apparatus 110. After the terminal apparatus 110 completes connection to the VD processing unit 215 indicated by the reported IP information, an application processing unit on the VD processing unit 215 transmits an in-house message. Thereafter, the relay apparatus 270 located between the VD processing unit 215 and an application server apparatus 340 uses the judging unit 290 to judge that the received message is transmitted from the VD processing unit 215 and uses the conversion unit 280 to obtain the access-source information. The judging unit 320 performs permission judging using the destination URL information extracted by the extraction unit 300 and the access-source information, thereby making it possible to perform access control corresponding to the access-source information and the destination application server apparatus.

Although the above description has been given of a case in which the relay apparatus 270 performs the permission judging, an external server apparatus may perform the permission judging. That is, the arrangement may also be such that a policy table storage unit 310 and the judging unit 320 are held on an external server apparatus, the external server apparatus judges whether or not to permit, and the relay apparatus 270 performs only relaying and discarding control corresponding to a result of the judging.

As described above, when a use request is issued from the VD processing unit 215 to the application server apparatus 340, access control corresponding to the location, the type, or the user of the terminal apparatus 110 that is accessing the VD processing unit 215 can be controlled to thereby reduce the risk of secret-data leakage. In addition, it is possible to prevent a user who uses a virtual desktop service from making unwanted access to the application server apparatus and the business data.

First Embodiment

The access control system 100 according to a first embodiment will be described with reference to FIGS. 5 to 20. First, a description will be given of a system configuration, addressing, and a pre-setting in the first embodiment.

Figure 5:
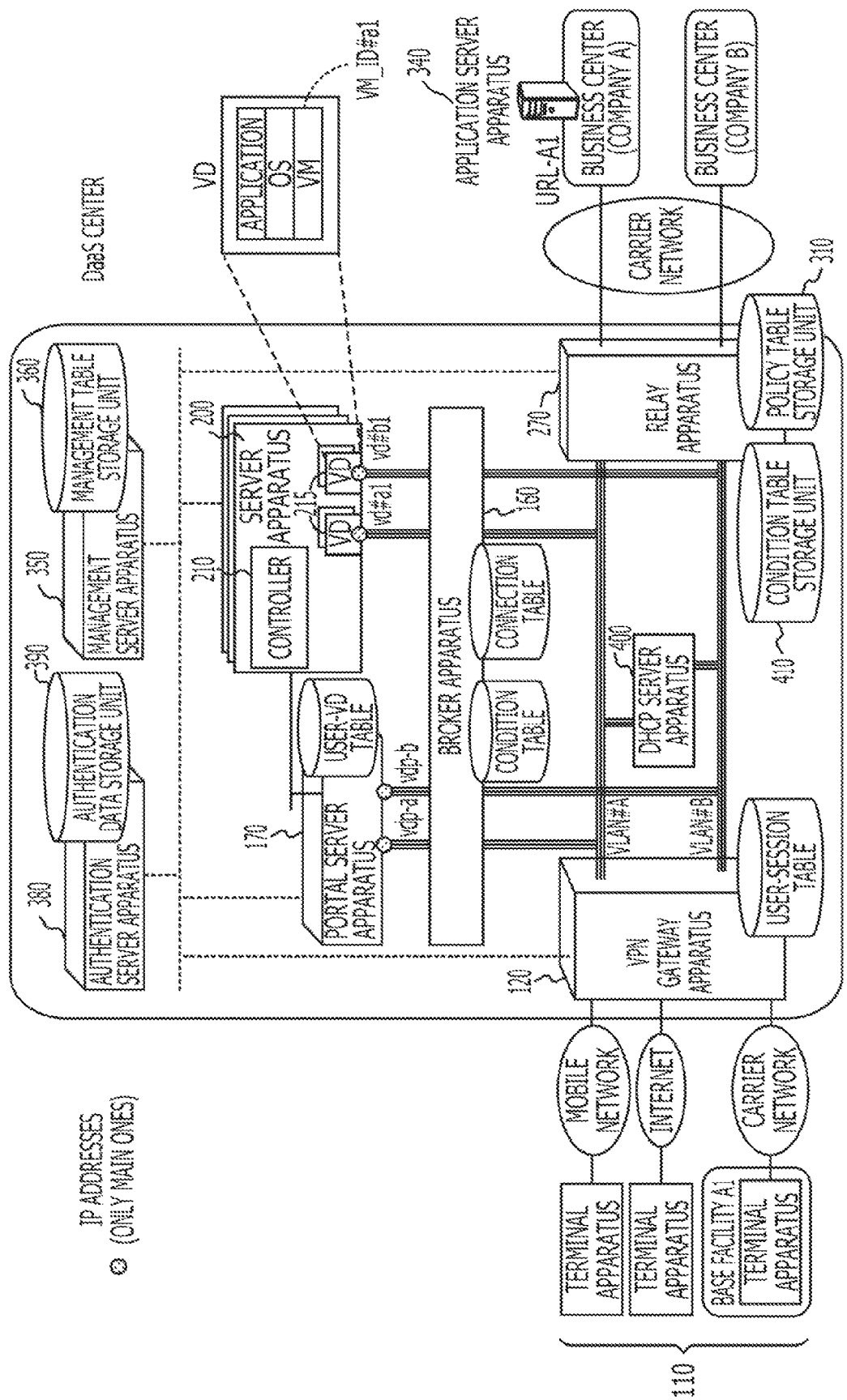
FIG. 5 illustrates the configuration of the access control system according to the first embodiment.

FIG. 5 illustrates a system configuration. The internal configuration of a server apparatus is substantially the same as that in the case of FIG. 4. A DHCP (dynamic host configuration protocol) server apparatus 400 in FIG. 5 is existing means that each VD processing unit 215 uses to determine the IP address thereof. An authentication server apparatus 380 collectively manages authentication information.

Addressing for company A will be described next. It is assumed that an in-DaaS-center company network is indicated by VLAN#A, the IP address of the portal server apparatus 170 is vdp-a (a private address that can be used within the company A, and the IP addresses of the VD processing units 215 are vd#a1 to vd#an (private addresses that can be used within the company A). For addressing for user a1, the IP address of the VD processing unit 215 is vd#a1 and the instance ID of the VM processing unit 250 is ID#a1.

Figure 15:
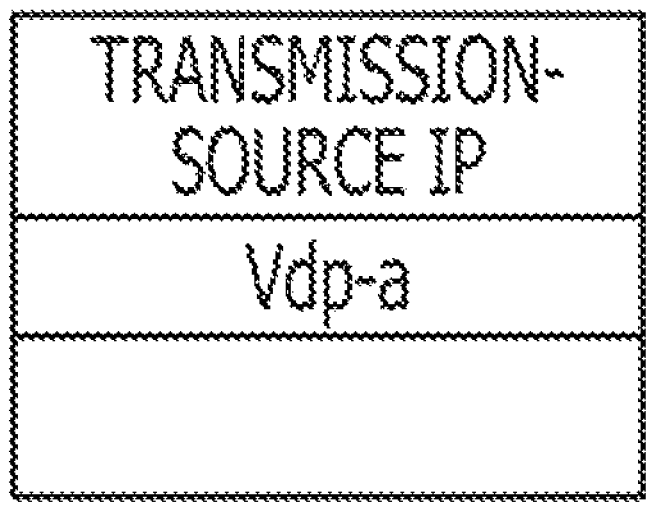
FIG. 15 illustrates one example of a condition table in the first embodiment.

Next, a description will be given of a pre-setting and an environment construction in the DaaS center for the company A. FIG. 12 illustrates one example of an authentication data storage unit for setting authentication information for each user. FIG. 15 illustrates setting of the broker apparatus 160. Transmission-source IP address "vdp-a" is set in a condition table as a condition for determining an authentication response message. IP addresses "vd#a1 to vd#an" that can be assigned to the VD processing units 215 for VLAN#A are set in the DHCP server apparatus 400. As illustrated in FIG. 18, VLAN "#A" and transmission-source IP addresses "vd#a1 to vd#an" are set in a condition table storage unit as conditions for determining whether or not a message is one transmitted from the VD processing unit or one transmitted from another node.

Figure 6:
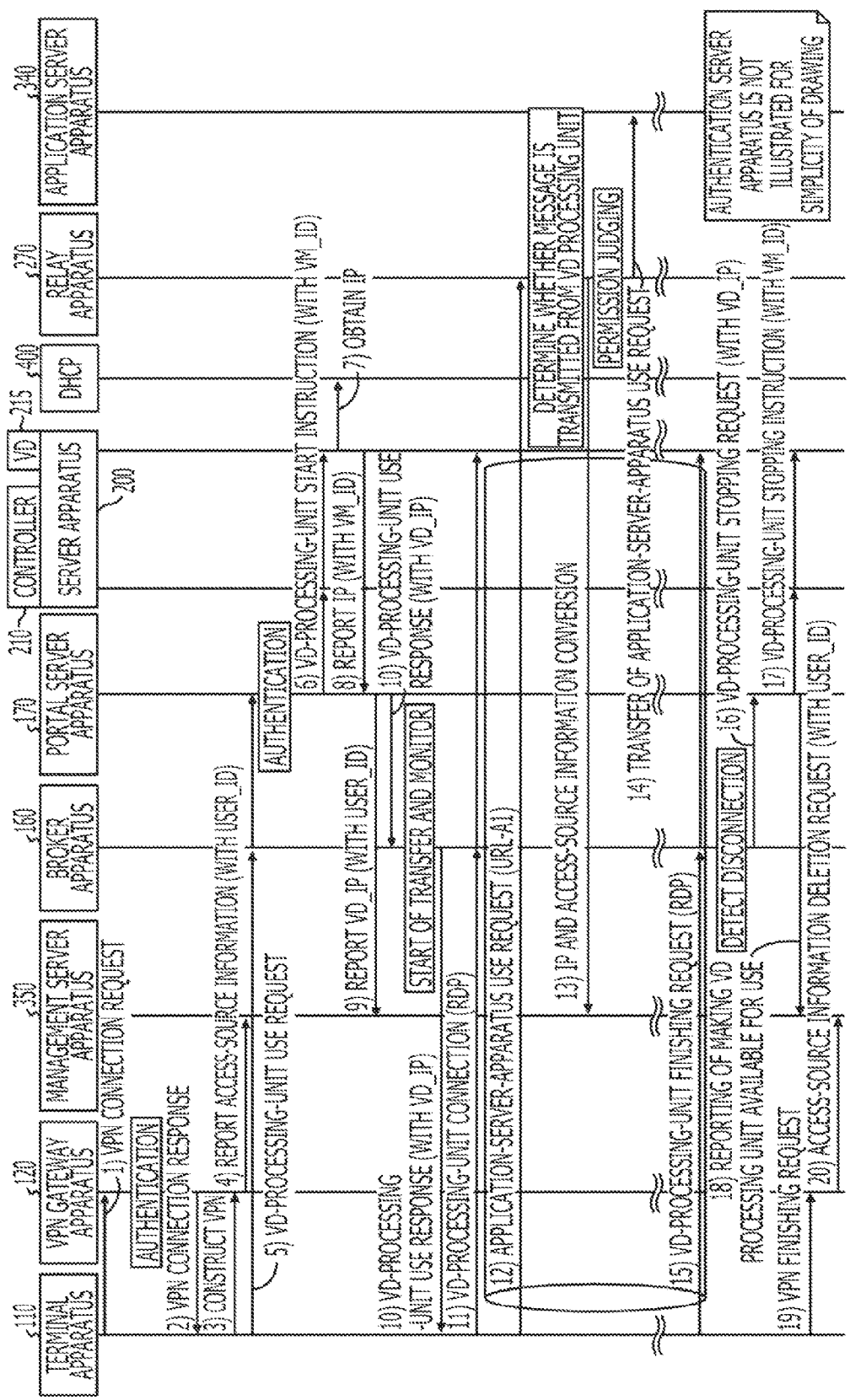
FIG. 6 illustrates an operation sequence of an access control system according to a first embodiment.
Figure 7:
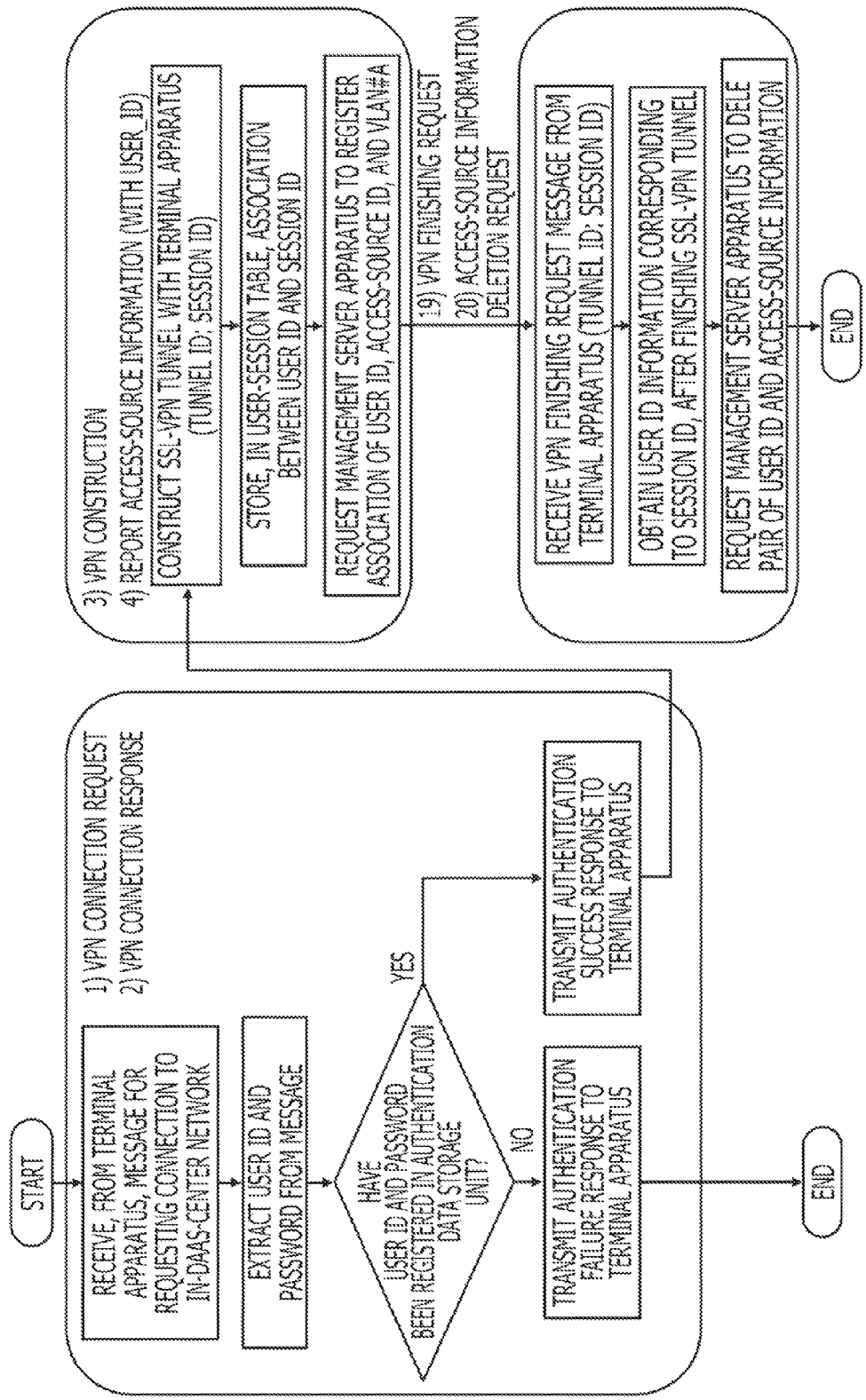
FIG. 7 illustrates an operation of a VPN gateway apparatus according to the first embodiment.
Figure 8:
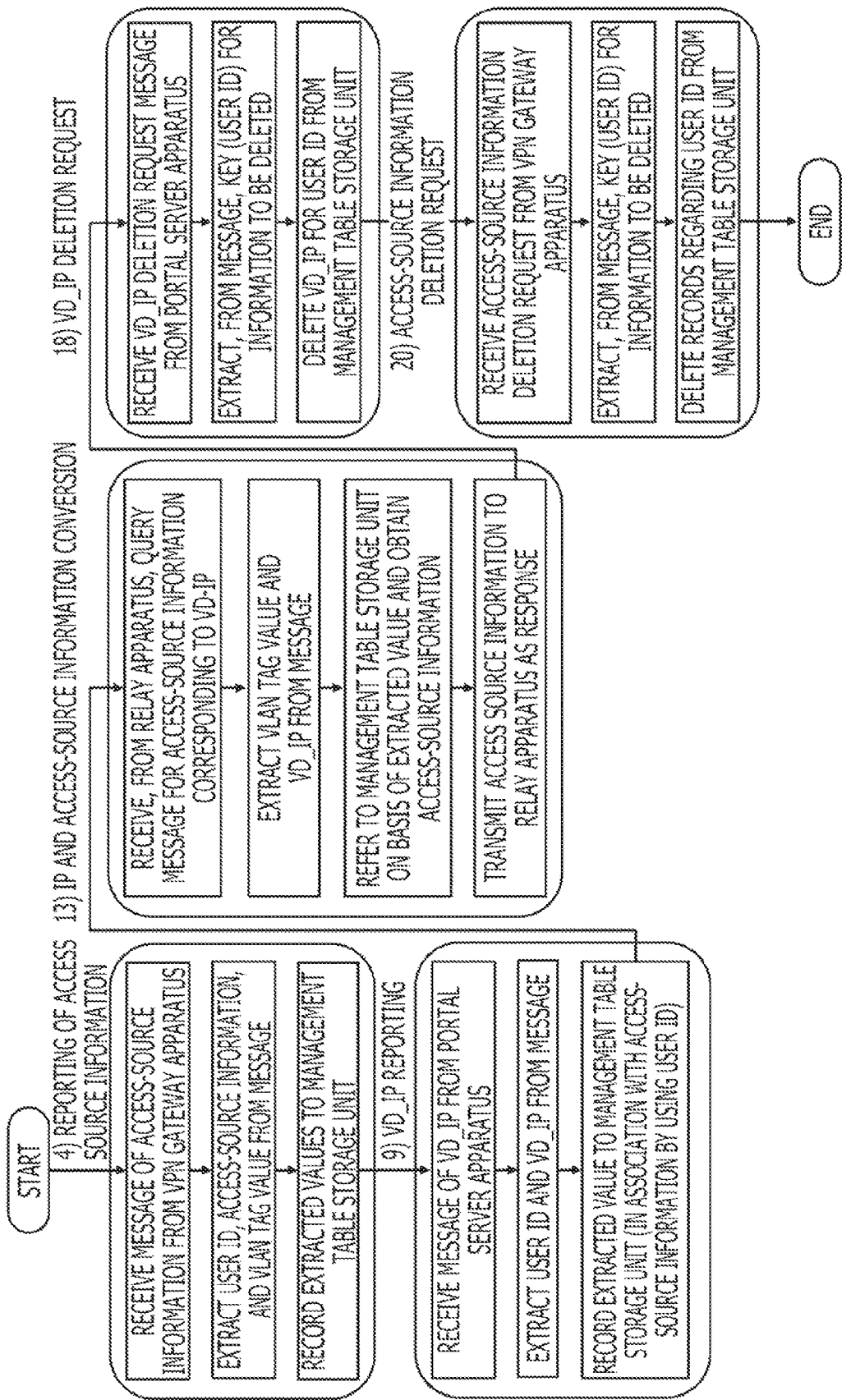
FIG. 8 illustrates an operation of a management server apparatus according to the first embodiment.
Figure 9:
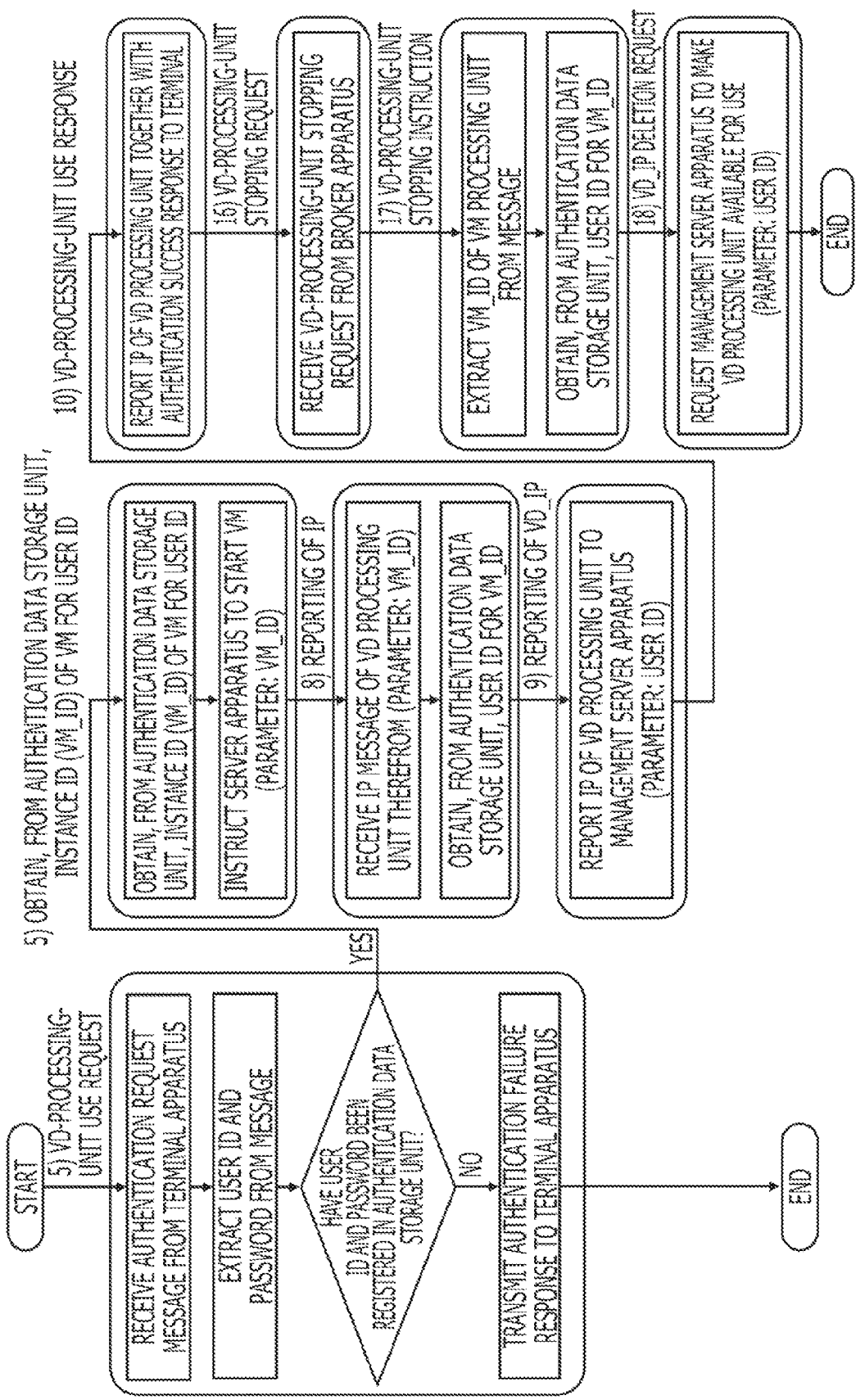
FIG. 9 illustrates an operation of a portal server apparatus according to the first embodiment.
Figure 10:
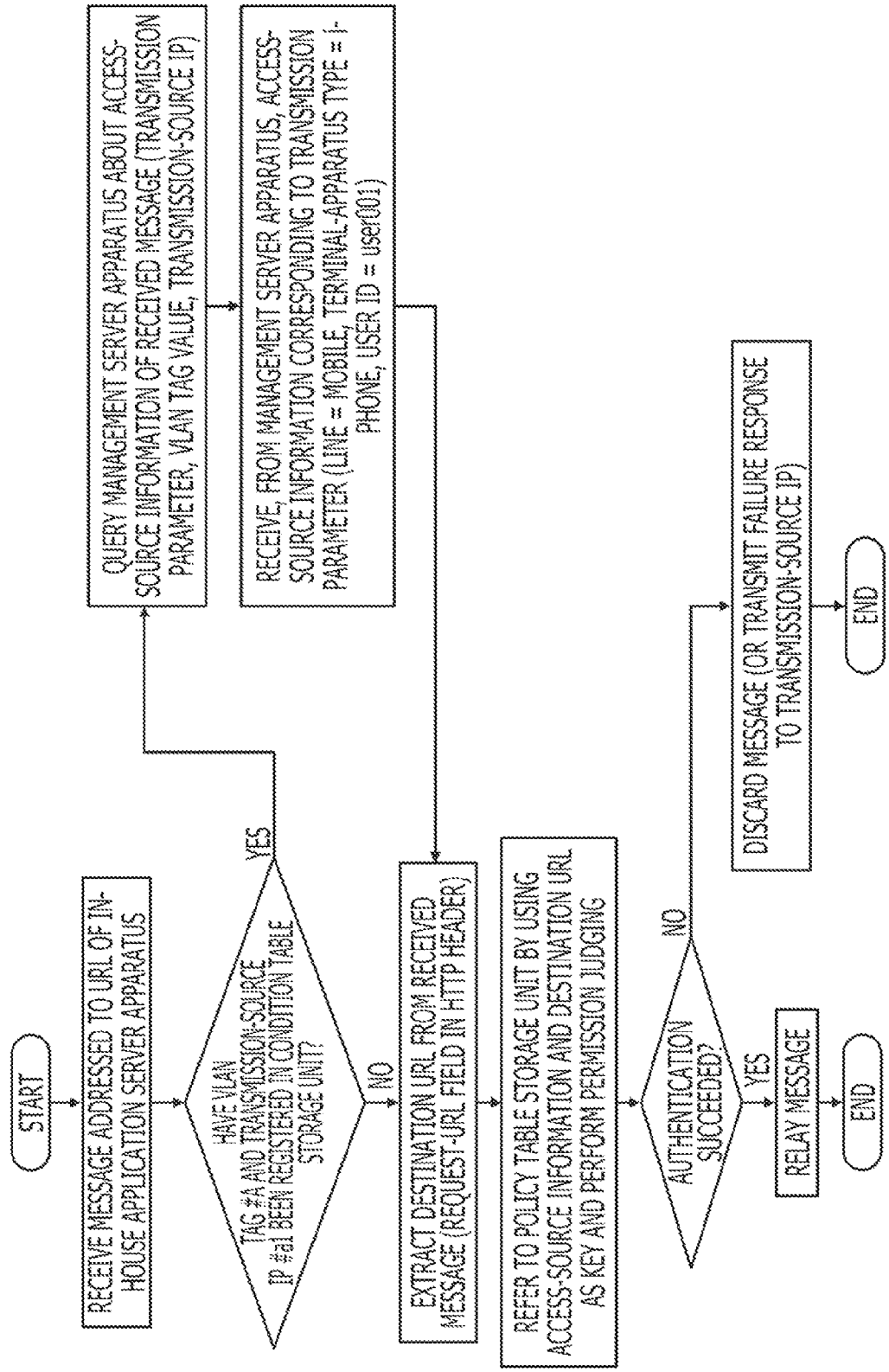
FIG. 10 illustrates an operation of a relay apparatus according to the first embodiment.

Processing of the access control system 100 according to the first embodiment will be described next with reference to FIG. 6. The description will be given in three separated phases: A) a flow until the user starts the VD processing unit 215; B) a flow of permission judging when the user accesses the application server apparatus by using the Web on the VD processing unit 215; and C) a flow until the user finishes the VD processing unit 215. FIGS. 7 to 10 illustrate details of a main server-apparatus flow in the sequence illustrated in FIG. 6.

A) Flow from when User Starts VD Processing Unit Until Access-Source Information is Recorded in Management Server Apparatus 1) A VPN connection request will now be described. The user issues a VPN connection request from the terminal apparatus 110 (a mobile phone in this case) to the VPN gateway apparatus 120.

2) A VPN connection response will now be described. The authentication unit 140 in the VPN gateway apparatus 120 transmits an authentication result to the terminal apparatus 110.

3) VPN construction will now be described. When the authentication succeeds, the terminal apparatus 110 constructs a VPN tunnel between the terminal apparatus 110 and the VPN terminal unit 150 in the VPN gateway apparatus 120, the VPN tunnel being identified with a session ID, and records a uID and the session ID to the user-session table. Thereafter, the VPN gateway apparatus 120 maps the VPN tunnel from the terminal apparatus 110 to the in-DaaS-center company network "VLAN#A". Thus, upon receiving a packet from the VPN tunnel, the VPN gateway apparatus 120 adds a VLAN tag #A to the packet and sends the resulting packet to the DaaS center.

4) Reporting of access-source information will now be described. The VPN gateway apparatus 120 uses the reporting unit 130 to report, to the management server apparatus 350, access-source information (i.e., access-source terminal-apparatus information (line=mobile, terminal-apparatus type=i-phone) and access-source user information (uID=user001)) obtained during authentication and VLAN tag information used for the in-DaaS-center company network. The management server apparatus 350 then records the reported information to the management table storage unit 360 illustrated in FIG. 14.

5) A VD-processing-unit use request will now be described. The user uses the constructed VPN tunnel to access a screen of the portal server apparatus in accordance with an HTTP (HyperText Transfer Protocol) and issues a VD-processing-unit use request to the IP address vdp-a.

6) A VD-processing-unit start instruction will now be described. During user authentication, the authentication unit 180 in the portal server apparatus 170 refers to the authentication data storage unit 390 to perform authentication and obtains the instance ID#a1 of the VM processing unit 250 for the user (uID#user001). Next, the controller 190 in the portal server apparatus 170 instructs the server apparatus 200 to start the VM processing unit 250 identified with the instance ID#a1. The controller 210 in the server apparatus 200 reads, from a HDD, a VM image identified with the instance ID#a1 and starts the VM processing unit 250 and the OS processing unit 230 in the VM processing unit 250.

7) Obtaining an IP address will be described. The OS processing unit 230 obtains the IP address of the VD processing unit 215 from the DHCP server apparatus 400 and uses the IP address as the VD processing unit 215.

8) Reporting of the IP address will be described. The reporting unit 240 in the OS processing unit 230 reports the obtained IP address, together with the instance ID#a1 of the VM processing unit 250, to the portal server apparatus 170.

9) Reporting of VD_IP will be described. The controller 190 in the portal server apparatus 170 refers to the authentication data storage unit 390 to obtain "user001" as a user ID corresponding to the reported instance ID#a1. Next, the controller 190 in the portal server apparatus 170 records, as a cache in the user-VD table illustrated in FIG. 19, an association between the user ID and the reported IP address of the VD processing unit 215, in order to stop the VD processing unit 215 at a later time. How the cache is used during the stopping is described in processing 17) and 18) below. The controller 190 in the portal server apparatus 170 reports information "user ID=user001, VD_IP=vd#a1" to the management server apparatus 350. In addition, the management unit 370 in the management server apparatus 350 binds the IP address of the VD processing unit 215 to the information related to the user001 and recorded in the management table storage unit 360 in processing 4) described above.

10) A VPN use response will now be described. The authentication unit 180 in the VD processing unit 215 reports vd#a1 to the terminal apparatus 110 as VD_IP. Next, since the transmission-source IP address is vdp-a, the broker apparatus 160 located between the portal server apparatus 170 and the terminal apparatus 110 regards that a packet is to be monitored, hooks the packet, and refers to the contents thereof. As a result of the reference, the broker apparatus 160 detects that an RDP connection for vd#a1 is to be started and registers, in a connection table illustrated in FIG. 16, "transmission-source IP address=terminal IP address, destination IP address=vd#a1" as a target to be monitored. In addition, the broker apparatus 160 directly transfers the hooked packet to the terminal apparatus 110.

11) VD connection will now be described. In accordance with a report, the terminal apparatus 110 connects to vd#a1 in accordance with the RDP. The broker apparatus 160 then records, to the connection table, the amount of flow of packets to vd#a1 per unit time. When there is no flow for a certain period of time, the broker apparatus 160 determines that the connection is broken. In this case, since there is a flow of packets, the broker apparatus 160 determines that the connection is being maintained and directly transfers the received packets. Thereafter, the VD processing unit 215 exchanges a keyboard operation and screen information with the terminal apparatus 110 in accordance with the RDP.

B) Flow of Permission Judging when User Accesses Application Server Apparatus 340 by Using the Web on VD Processing Unit 215

Figure 11:
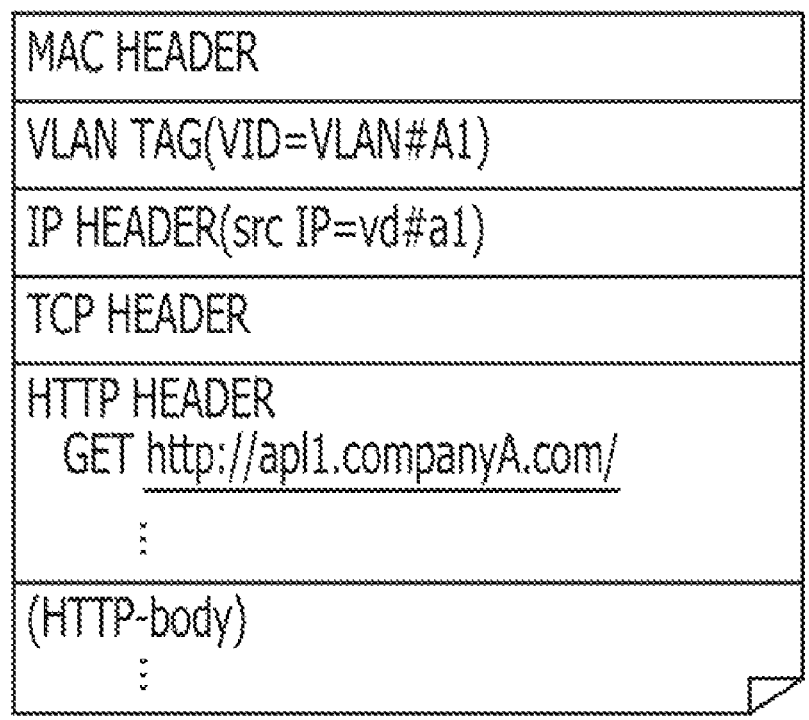
FIG. 11 illustrates one example of a message transmitted from a VD processing unit to a application server apparatus in the first embodiment.

12) An application-server-apparatus use request will now be described. A description will be given of an example in which the user operates the Web on the VD processing unit 215 and enters URL "url-A1" in order to access the in-house application server apparatus 340. In response to the user operation, the VD processing unit 215 transmits a message "VLAN tag=#A, transmission-source IP=vd#a1" to the application server apparatus 340. FIG. 11 illustrates the format of the message.

13) IP and access-source information conversion will now be described. The judging unit 290 in the relay apparatus 270 refers to a condition table storage unit 410 to judge whether or not a received message is one transmitted from the VD processing unit. Since the result of the determination indicates a match with the conditions "VLAN#A, transmission-source IP=vd#a1 to vd#an", the judging unit 290 judges that the received message is one transmitted from the VD processing unit. Next, the conversion unit 280 in the relay apparatus 270 passes the information "VLAN tag=#A, transmission-source IP address=vd#a1" to the management server apparatus 350 and obtains access-source information "line=mobile, terminal-apparatus type=i-phone, user ID=user001" as a response. Next, the extraction unit 300 in the relay apparatus 270 extracts a destination URL from a GET field in an HTTP header of the received message. The judging unit 320 in the relay apparatus 270 then refers to the policy table storage unit 310, illustrated in FIG. 17, to perform permission judging. A reference key is the access-source information and the destination URL in the received message.

14) Transfer of the application-server-apparatus use request will now be described. The relay apparatus 270 relays or discards a message in accordance with a result of the permission judging. When the result of the permission judging indicates a success, the relay apparatus 270 relays the message. When the result of the permission judging indicates a failure, the relay apparatus 270 discards the message and sends a failure response.

C) Flow Until User Finishes VD Processing Unit

15) A VD-processing-unit finishing request will now be described. When the user wishes to finish the use of the VD processing unit 215, he or she operates the OS processing unit 230 in the VD processing unit 215 to issue a request for stopping the VD processing unit 215 or closes the screen provided by the VD processing unit 215 to issue a request for stopping the VD processing unit 215.

16) A VD-processing-unit stopping request will now be described. The broker apparatus 160 detects that the amount of flow in the connection of "transmission-source IP address=terminal IP address, destination IP address=vd#a1" is zero for a certain period of time. The broker apparatus 160 then detects a break of the connection and requests the portal server apparatus 170 to stop the VD processing unit 215 indicated by vd#a1.

17) A VD-processing-unit stopping instruction will now be described. The controller 190 in the portal server apparatus 170 refers to the user-VD table to obtain a uID corresponding to the IP information "vd#a1" of the VD processing unit 215. In addition, the controller 190 in the portal server apparatus 170 refers to the authentication data storage unit 390 to obtain the instance ID information "#a1" of the VM processing unit 250 corresponding to the user ID. Thereafter, the controller 190 instructs the server apparatus 200 to stop the VM processing unit 250 having the instance ID#a1. The controller 210 in the server apparatus 200 then stops the VM processing unit 250 identified with the instance ID#a1.

18) Reporting of making VD-processing-unit available for use will now be described. The controller 190 in the portal server apparatus 170 requests the management server apparatus 350 to make the VD processing unit 215 available for use, by using the user ID as a parameter. The management unit 370 in the management server apparatus 350 then deletes the VD-IP information "vd#a1" for uID#a.

19) A VPN finishing request will now be described. When the user wishes to finish the use of the VPN, he or she issues a request for stopping the VPN by using the terminal apparatus 110. The VPN terminal unit 150 in the VPN gateway apparatus 120 finishes the VPN tunnel with the session-ID for which the request is issued. In addition, the VPN terminal unit 150 obtains, from the user-session table, uID "user001" corresponding to the session ID.

20) An access-source information deletion request will now be described. The reporting unit 130 in the VPN gateway apparatus 120 requests the management server apparatus 350 to delete the information regarding user001. Thus, the management unit 370 in the management server apparatus 350 deletes the information regarding user001.

The above-described operation makes it possible to perform access control corresponding to the location and the type of terminal apparatus that is accessing the VD processing unit. Although an example in which the terminal apparatus of the user is a mobile phone has been described in the first embodiment, the same is also applicable to a case in which the terminal apparatus is a PC (personal computer) on the Internet, a smart phone, or a PC in a base facility.

Although a case in which the relay apparatus 270 performs permission judging has been described in the first embodiment, an external server apparatus may perform the permission judging. For example, the processing of the extraction unit 300 in processing 13) described above may be realized by a configuration and operation as follows. In the configuration, a permission server apparatus including the policy table storage unit 310 is further provided as the server apparatus for performing the permission judging. In the operation, the relay apparatus 270 transmits, to the permission server apparatus, a permission-determination request message specifying a reference key (access-source information and a destination URL in the received message). The permission server apparatus then refers to the policy table storage unit 310 to perform permission judging and issues a response indicating the permission judging to the relay apparatus 270.

Figure 20:
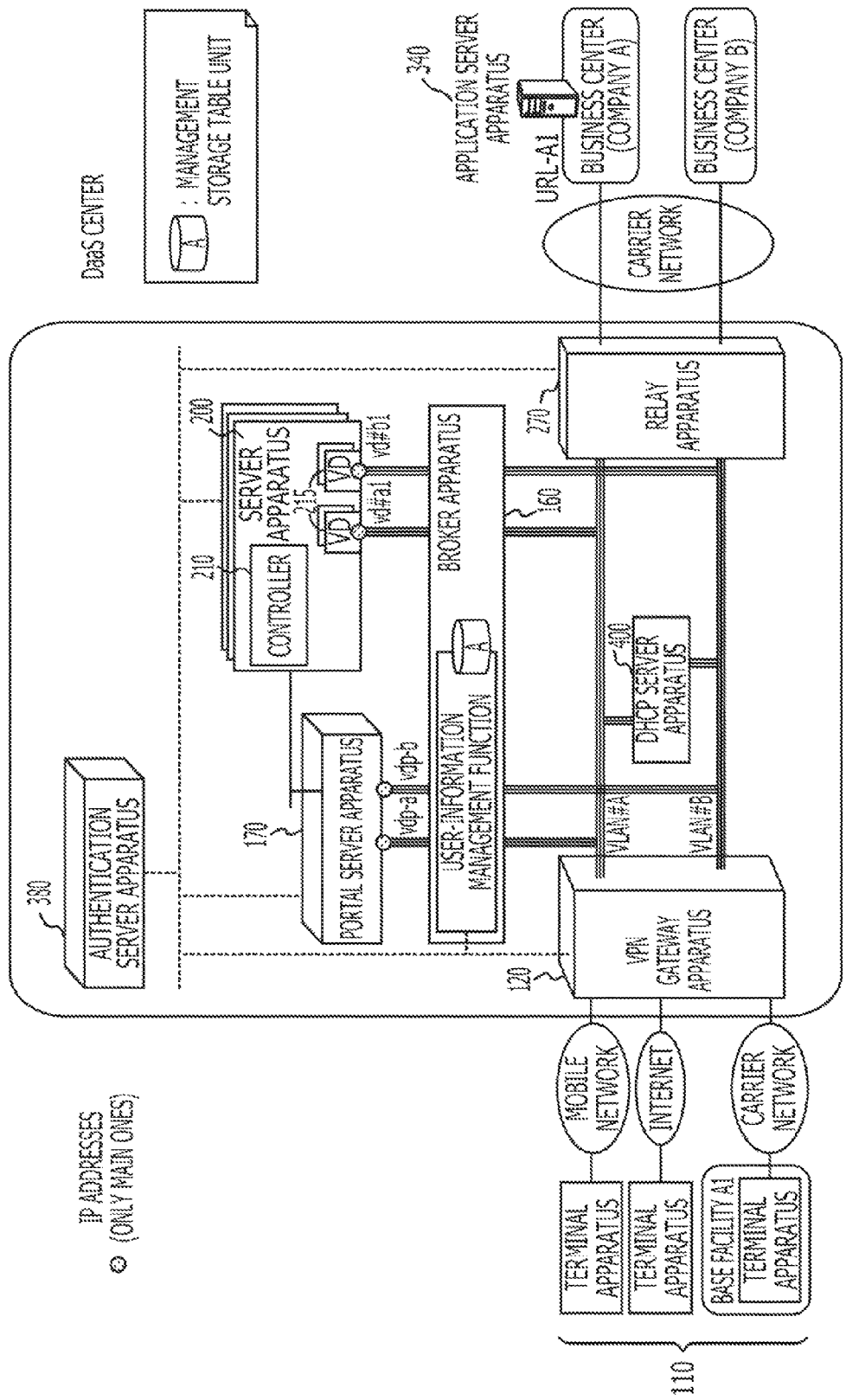
FIG. 20 illustrates a first modification of the access control system according to the first embodiment.
Figure 21:
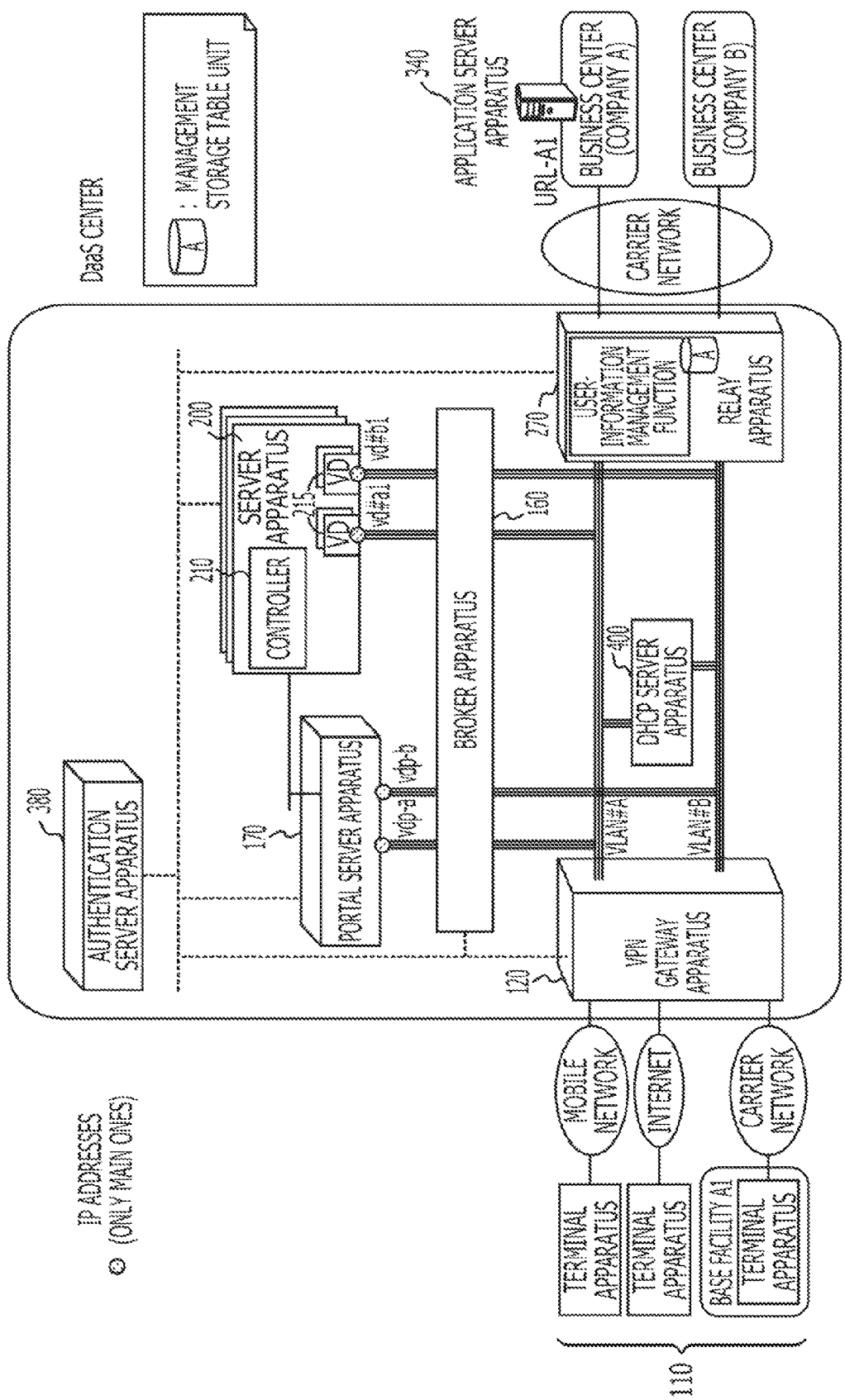
FIG. 21 illustrates a second modification of the access control system according to the first embodiment.

Although an example in which the access-source information used as a key for the permission judging is "line, terminal-apparatus type, user ID" has been described in the first embodiment, the access-source information may include other parameters. For example, the access-source information may include a terminal IP address, access time, and so on. Although the management server apparatus 350 is independently provided as a server apparatus for managing the management table storage unit 360 in the first embodiment, an existing server apparatus may include the management table storage unit 360. For example, as illustrated in FIG. 20, the broker apparatus 160 may include the management table storage unit 360. Alternatively, as illustrated in FIG. 21, the relay apparatus 270 may include the management table storage unit 360.

Second Embodiment

An access control system 100 according to a second embodiment will now be described with reference to FIGS. 22 and 23. A description will be given of a case in which VD-processing-unit access made by a base facility does not go through the VPN gateway apparatus.

Figure 22:
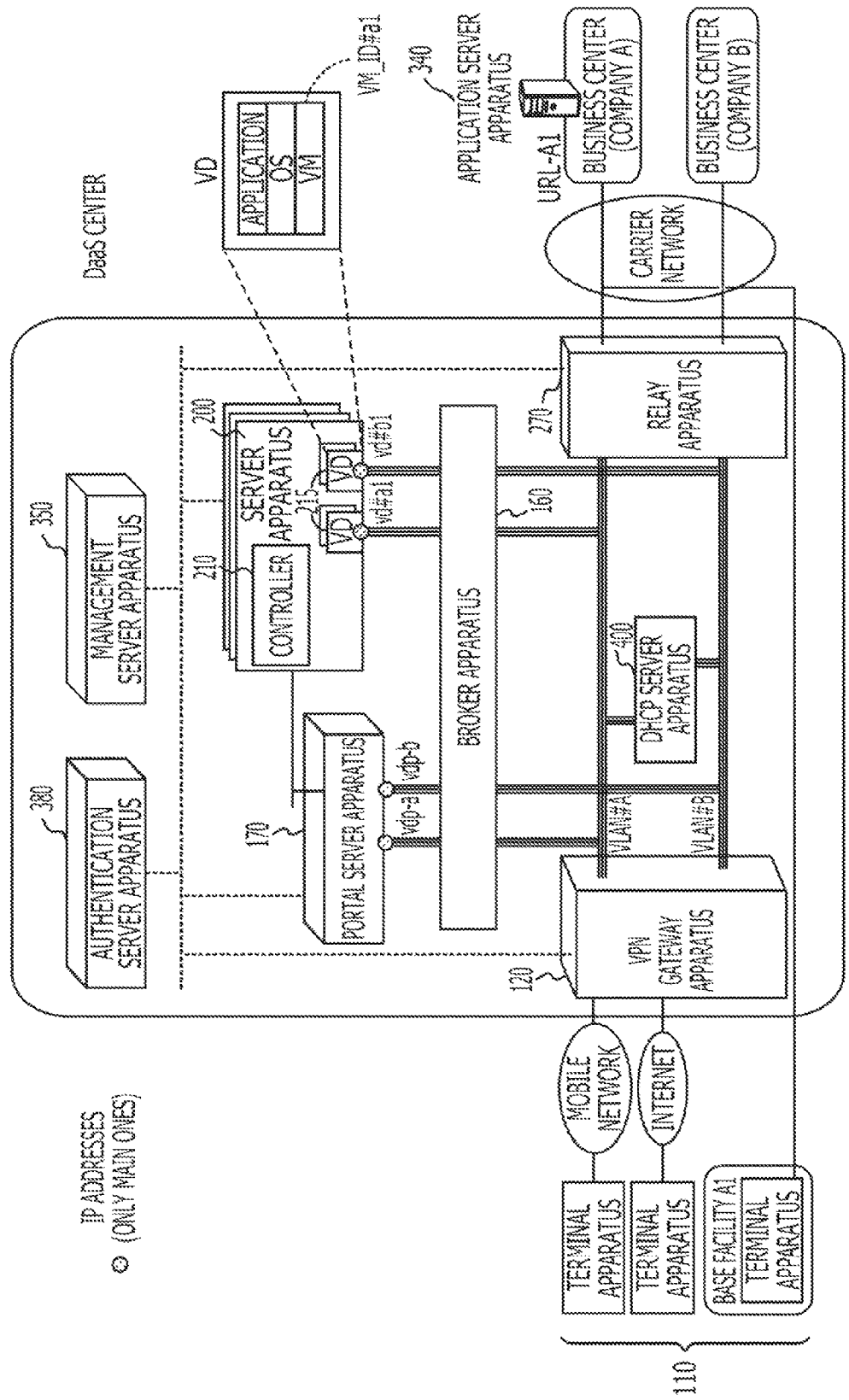
FIG. 22 illustrates the configuration of an access control system according to a second embodiment.
Figure 23:
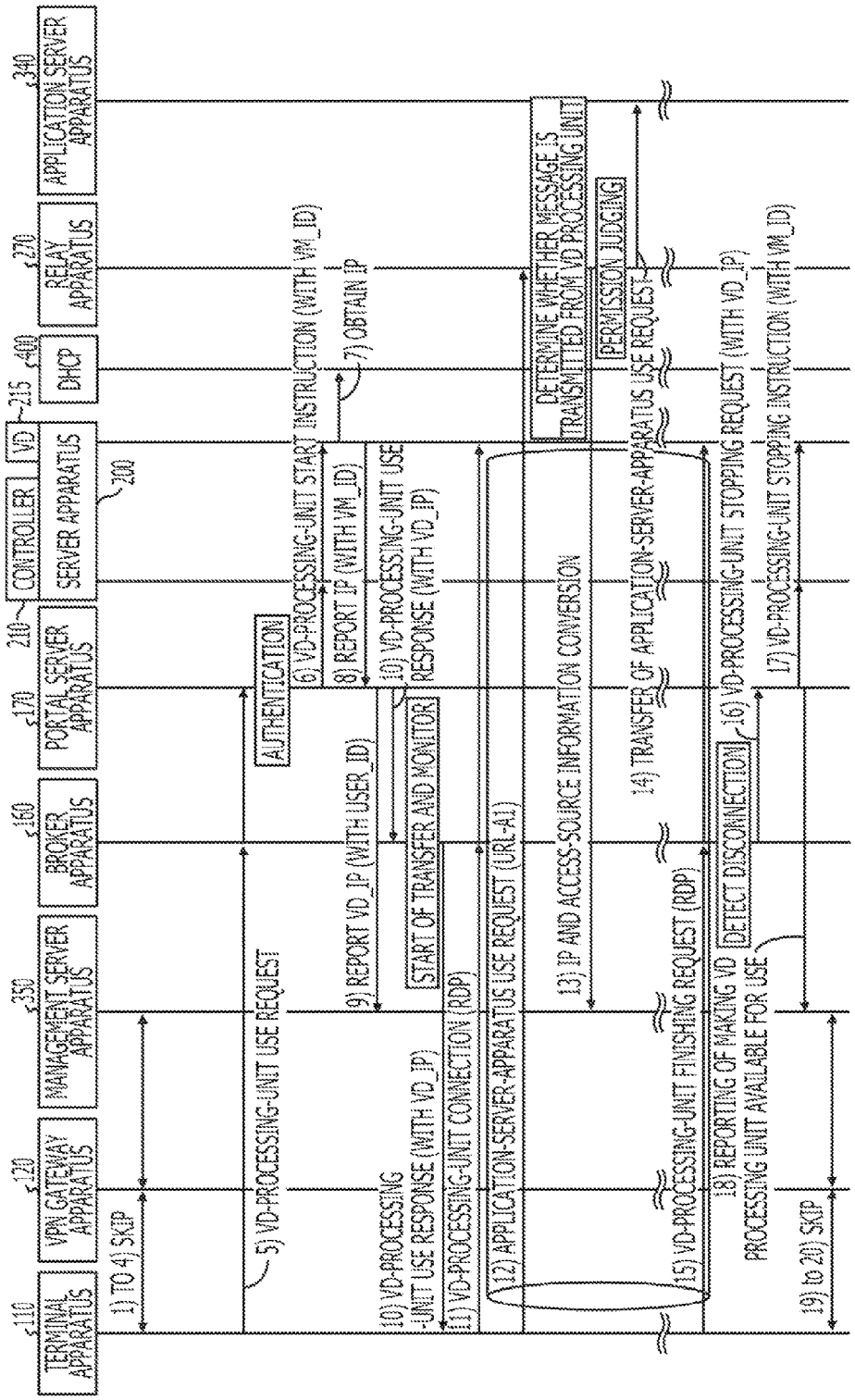
FIG. 23 illustrates an operation sequence of the access control system according to second embodiment.

FIG. 22 illustrates a system configuration of the access control system 100 according to the second embodiment. The internal configurations of individual server apparatuses are substantially the same as those illustrated in FIG. 4. In FIG. 22, a table storage unit and a data storage unit included in each server apparatus are substantially the same as those in the first embodiment, and thus descriptions thereof are not given hereinafter.

Processing of the access control system 100 will be described below in conjunction with a sequence illustrated in FIG. 23. The description will be given in three separate phases, as in the first embodiment. Numerals in the sequence corresponds to those in the first embodiment, and in the second embodiment, descriptions of operations that are substantially the same as those in the first embodiment are not given hereinafter.

A) Flow from when User Starts VD Processing Unit Until Access-Source Information is Recorded in Management Server Apparatus Processing in 1) and 4) is not performed in the second embodiment.

5) A VD-processing-unit use request will now be described. Using the HTTP, the user accesses the screen of the portal server apparatus via an in-house network for the company A, the in-house network being pre-constructed by a carrier, and issues a request for using the VD processing unit 215 to vdp-a.

Since processing 6) to 8) is substantially the same as that in the first embodiment, a description thereof is not given hereinafter.

9) Reporting of VD_IP will be described. The controller 190 in the portal server apparatus 170 refers to the authentication data storage unit 390 to obtain "user001" as a user ID corresponding to the reported instance ID#a1. Next, the controller 190 in the portal server apparatus 170 records, as a cache in the user-VD table, an association between the user ID and the reported IP address of the VD processing unit 215 in order to stop the VD processing unit 215 at a later time. The controller 190 in the portal server apparatus 170 reports information "user ID=user001, VD_IP=vd#a1, line=in-house base facility, terminal-apparatus type=PC" to the management server apparatus 350. When the IP address of the transmission-source terminal apparatus 110 is an IP address assigned to one of the terminal apparatuses in the base facility, it is determined that the line is an in-house base facility. Unlike the first embodiment, the controller 190 also reports the terminal-apparatus type information.

Since the access-source information of user001 is not registered in the management table storage unit 360, the management unit 370 in the management server apparatus 350 determines that the user at the in-house base facility is accessing the portal server apparatus 170. The management unit 370 newly registers, in the management table storage unit 360, entries of access-source terminal-apparatus information "line=base facility, terminal-apparatus type=PC", access-source user information "user ID=user001", and a tenant identifier "VLAN#A".

Since processing 10) to 17) is substantially the same as that in the first embodiment, a description thereof is not given hereinafter.

18) Reporting of making VD processing unit available for use will now be described. The controller 190 in the portal server apparatus 170 requests the management server apparatus 350 to make the VD processing unit 215 available for use, by using the user ID as a parameter. Next, the management unit 370 in the management server apparatus 350 deletes the VD-IP information "vd#a1" for uID#a. In this case, since "line=base facility" is recorded in the management table storage unit 360, it is determined that a VPN gateway apparatus 120 does not exist between the terminal apparatus and the VD processing unit. Thus, the management table storage unit 360 deletes all information of user ID#a from the management table storage unit 360.

Processing 19) and 20) is not performed in the second embodiment.

As described above, the access control system 100 according to the second embodiment is assumed to be capable of performing access control corresponding to the location and the type of terminal apparatus accessing the VD processing unit even when access from the base facility does not go through the VPN gateway apparatus.

Although embodiments of the present invention have been described above in detail, the present invention is not limited to the particular embodiments and various changes and modifications can be made thereto without departing from the spirit and scope of the present invention disclosed in the scope of the appended claims.

The present invention is intended to provide an access control system and an access control method that enable access control corresponding to access-source terminal-apparatus information for the VD processing unit when the application server apparatus is used from the VD processing unit.

A factor of the above-described problem will first be described. First, since the OS on the VD processing unit is an existing OS for the desktop and thus behaves like a physical terminal apparatus for the application server apparatus, the transmission-source address of a message transmitted from the VD processing unit is the VD processing unit. For such a reason, secondary, the relay apparatus between the VD processing unit and the application server apparatus cannot know the access-source terminal apparatus.

An approach to solving the problem will be described next. The VPN gateway apparatus manages association information "user ID, access-source terminal-apparatus information". Thus, if the relay apparatus can know a uID (i.e., user ID) on the basis of the message transmitted from the VD processing unit, the relay apparatus can know not only the destination URL but also the access source by referring to the information of the VPN gateway apparatus by using the uID as a key.

On the other hand, since the VD processing unit is occupied by a single user because of characteristics of the service, the IP address of the VD processing unit is unique to each user. That is, since a server apparatus that serves as a platform, such as a proxy server apparatus, is shared by multiple users, the IP address of the server apparatus is shared by the multiple users but the VD processing unit is occupied by a single user because of a feature unique to the DaaS. Thus, if the relay apparatus can know the relationship between the IP address of each VD processing unit and the uID, it can identify the access source.

In the operation mechanism of the DaaS, in order to report the IP address of the VD processing unit to the terminal apparatus, the portal server apparatus manages association information "uID, IP address of the VD processing unit".

Thus, the IP address of the VD processing unit and the access-source information can be linked on the basis of the information managed by the VPN gateway apparatus and the portal server apparatus, so that the relay apparatus can identify the access-source information on the basis of the transmission-source IP (src IP) of the message transmitted from the VD processing unit.

According to the above-described embodiments, when a application server apparatus is to be used from the VD processing unit, it is possible to enable access control corresponding to the access-source terminal-apparatus information for the VD processing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

What is claimed is:

1. An access control system comprising:
a providing unit that provides a virtual-desktop-service, which was selected on the basis of an identification information acquired from a terminal apparatus, to the terminal apparatus, and sends a message that includes an address of the providing unit as a source address and an address of an application program booted by a process of the virtual-desktop-service as a destination address;
a first storage unit that stores the identification information associated with the address of the providing unit;
a second storage unit that stores an access control information associated with a set of a identification information and an address of an application program; and
a relay unit that receives a message sent by the providing unit, acquires an identification information, which was associated with an address corresponding to a source address included in the received message, from the first storage unit, acquires an access control information, which was associated with a set of the acquired identification information and an address corresponding to a destination address included in the received message, from the second storage unit, and controls relaying the message depending on the acquired access control information.

2. The access control system according to claim 1 wherein the terminal apparatus communicates with the providing unit via a gateway apparatus that authenticates the terminal apparatus on the basis of the identification information.

3. An access control system comprising:
a providing unit that provides a virtual-desktop-service, which was selected on the basis of an identification information acquired from a terminal apparatus, to the terminal apparatus, and sends a message that includes an address of the providing unit as a source address and an address of an application program booted by a process of the virtual-desktop-service as a destination address;
a first storage unit that stores a type information of a communication line of the terminal apparatus and the identification information associated with the address of the providing unit;
a second storage unit that stores an access control information associated with a set of a identification information, a type information of a communication line and an address of an application program; and
a relay unit that receives a message sent by the providing unit, acquires an identification information and a type information, which was associated with an address corresponding to a source address included in the received message, from the first storage unit, acquires an access control information, which was associated with a set of the acquired identification information, the acquired type information and an address corresponding to a destination address included in the received message, from the second storage unit, and controls relaying the message depending on the acquired access control information.

4. The access control system according to claim 3 wherein the terminal apparatus communicates with the providing unit via a gateway apparatus that authenticates the terminal apparatus on the basis of the identification information.

5. The access control system according to claim 4 comprising the first storage unit wherein stores the type information and the identification information associated with the address of the providing unit on the basis of a set of the identification information and the type information acquired from the terminal apparatus and a set of the identification information and the address of the providing unit acquired from the providing unit 6. An access control method for a system comprising a providing unit, a first storage unit, a second storage unit, and a relay unit, the method comprising:
providing a virtual-desktop-service, which was selected on the basis of an identification information acquired from a terminal apparatus, to the terminal apparatus by the providing unit;
sending a message that includes an address of the providing unit as a source address and an address of an application program booted by a process of the virtual-desktop-service by the providing unit as a destination address;
storing the identification information associated with the address of the providing unit in the first storage unit;
storing an access control information associated with a set of a identification information and an address of an application program in the second storage unit;
receiving a message sent by the providing unit by the relay unit,
retrieving an identification information, which was associated with an address corresponding to a source address included in the received message, from the first storage unit by the relay unit;
retrieving an access control information, which was associated with a set of the acquired identification information and an address corresponding to a destination address included in the received message, from the second storage unit by the relay unit; and
controlling relaying the message depending on the acquired access control information by the relay unit.

* * * * *